US011944110B2

(12) United States Patent
Hilhorst et al.

(10) Patent No.: US 11,944,110 B2
(45) Date of Patent: Apr. 2, 2024

(54) MEAT TREATMENT COMPOSITION AND USE THEREOF

(71) Applicant: Purac Biochem B.V., Gorinchem (NL)

(72) Inventors: Gerrit Anthon Rene Hilhorst, Gorinchem (NL); Harmen Kroon, Gorinchem (NL); Jacobus Johannes Adriana Maria Verheezen, Gorinchem (NL)

(73) Assignee: Purac Biochem B.V., Gorinchem (NL)

( * ) Notice: Subject to any disclaimer, the term of this patent is extended or adjusted under 35 U.S.C. 154(b) by 0 days.

(21) Appl. No.: 15/736,991

(22) PCT Filed: Jun. 17, 2016

(86) PCT No.: PCT/NL2016/050435
§ 371 (c)(1),
(2) Date: Dec. 15, 2017

(87) PCT Pub. No.: WO2016/204618
PCT Pub. Date: Dec. 22, 2016

(65) Prior Publication Data
US 2018/0153197 A1    Jun. 7, 2018

Related U.S. Application Data

(60) Provisional application No. 62/180,790, filed on Jun. 17, 2015.

(30) Foreign Application Priority Data

Jun. 17, 2015  (EP) ..................... 15172520

(51) Int. Cl.
| | | |
|---|---|---|
| *A23L 13/40* | (2023.01) | |
| *A23B 4/027* | (2006.01) | |
| *A23B 4/20* | (2006.01) | |
| *A23L 3/3454* | (2006.01) | |
| *A23L 3/3472* | (2006.01) | |
| *A23L 5/10* | (2016.01) | |
| *A23L 13/50* | (2016.01) | |
| *A23L 13/60* | (2016.01) | |
| *A23L 13/72* | (2023.01) | |
| *A23L 29/00* | (2016.01) | |
| *A23L 29/206* | (2016.01) | |
| *A23L 29/212* | (2016.01) | |
| *A23L 29/256* | (2016.01) | |

(52) U.S. Cl.
CPC ............ *A23L 13/426* (2016.08); *A23B 4/027* (2013.01); *A23B 4/20* (2013.01); *A23L 3/3454* (2013.01); *A23L 3/3472* (2013.01); *A23L 5/13* (2016.08); *A23L 5/19* (2016.08); *A23L 13/422* (2016.08); *A23L 13/428* (2016.08); *A23L 13/52* (2016.08); *A23L 13/55* (2016.08); *A23L 13/60* (2016.08); *A23L 13/72* (2016.08); *A23L 29/03* (2016.08); *A23L 29/206* (2016.08); *A23L 29/212* (2016.08); *A23L 29/256* (2016.08); *A23V 2002/00* (2013.01)

(58) Field of Classification Search
CPC ........ A23L 13/426; A23L 13/52; A23L 13/55; A23L 13/422; A23L 13/60; A23L 13/72; A23L 13/428
See application file for complete search history.

(56) References Cited

U.S. PATENT DOCUMENTS

| | | | | |
|---|---|---|---|---|
| 4,225,628 | A  * | 9/1980 | Lynn ....................... | A21D 2/36 |
| | | | | 426/472 |
| 6,020,012 | A | 2/2000 | Kauffman et al. | |
| 2004/0219283 | A1 | 11/2004 | Evans | |
| 2007/0059423 | A1* | 3/2007 | Toledo .................... | A23B 4/12 |
| | | | | 426/589 |

FOREIGN PATENT DOCUMENTS

| | | | |
|---|---|---|---|
| EP | 2 227 965 | A1 | 9/2010 |
| JP | H06-343423 | A | 12/1994 |
| WO | WO-2015/026975 | A1 | 2/2015 |

OTHER PUBLICATIONS

MadeHow. "How Vinegar is made", vol. 7, Sep. 9, 2013. Retrieved from Internet URL <http:www.madehow.com/Volume-7/Vinegar.html>) (Year: 2013).*
Kimball, "Citrus Processing: Quality Control and Technology", 1991. (Year: 1991).*
Anonymous: "Gesund grillen: Mit leckeren Marinaden!", Sep. 3, 2014, retrieved from the Internet: URL:https://web.archive.org/web/20140903064344/http://www.bildderfrau.de/kochschule/gesund-grillen-grillfleisch-marinieren-d9255.html.
Database GNPD [Online] Mintel, Anonymous: "Sweet Asian BBQ marinade with simply Asia", Mar. 2015, XP002743119.
Database GNPD [Online] Mintel, Anonymous: "Western marinated pork neck steaks", Apr. 2015, XP002743120.
Sijtsema et al., "Cultured corn sugar and vinegar as a clean label antimicrobial solution in ready-to-eat meats", Meat Science, 1996, vol. 96, No. 1, p. 482.
Tomaszewska-Gras et al,. "Effect of marination on the thermodynamic properties of chicken muscle proteins studied by DSC", Czech Journal of Food Science, 2012, vol. 30, No. 4, pp. 302-308.

(Continued)

*Primary Examiner* — Stephanie A Cox
(74) *Attorney, Agent, or Firm* — Foley & Lardner LLP

(57) ABSTRACT

This invention concerns reduction of moisture loss during the processing of meat. The present invention resides in the finding that pre-treatment of fresh meat with compositions comprising acetic acid salts and certain polysaccharide materials can reduce moisture loss with as much as 15%, as compared to non-treated meat. In some embodiments, the compositions are based on ingredients that can be labeled as 'natural ingredients'. The invention provides compositions comprising such combinations of one or more acetic acid salts with one or more polysaccharide materials; methods and uses involving the treatment of meat with said compositions; as well as the meat products that are accordingly obtained.

7 Claims, No Drawings

(56) References Cited

OTHER PUBLICATIONS

International Search Report issued in International Patent Application No. PCT/NL2016/050435, dated Aug. 31, 2016.

* cited by examiner

MEAT TREATMENT COMPOSITION AND USE THEREOF

CROSS-REFERENCE TO RELATED APPLICATIONS

This application is the National Phase of International Patent Application No. PCT/NL2016/050435, filed Jun. 17, 2016, published on Dec. 22, 2016 as WO 2016/204618 A1, which claims priority to U.S. Provisional Application No. 62/180,790, filed Jun. 17, 2015 and to European Patent Application No. 15172520.7, filed Jun. 17, 2015. The contents of these applications are herein incorporated by reference in their entirety.

FIELD OF INVENTION

This invention concerns reduction of moisture loss during the processing of meat. More in particular, compositions are provided that can be used for treatment of meat, thereby reducing meat juice loss during processing, resulting in an increase of both the mass yield and the organoleptic quality of the meat after the processing. Treatment of meat with compositions of the invention as well as the treated meat products obtained accordingly constitute part of the invention as well.

BACKGROUND OF THE INVENTION

Juiciness and tenderness are quality attributes of meat that are highly discriminative for consumers in judging the quality thereof. These attributes are very much dependent on the amount of water in the meat at the time the food is consumed. All processing steps in the conversion of a fresh animal muscle into a ready-to-consume product however create a stress factor which results in the loss of moisture from the muscle in the form of "drip" in frozen and thawed products, "purge" in raw meats stored under refrigeration, and in cooking loss when the raw muscle is heated prior to serving.

Loss of liquid mainly reflects loss of water and, to a lesser extent loss of liquid fat, which collectively make up the juice of the meat. Moisture loss is problematic for all types of muscle meat products, which may contain as much as 80% moisture. Typically, during cooking meat may lose 30% to 40% of its weight as shrink during the cooking process. During refrigeration, meat may lose 1% to 3% of its total weight. Freezing and thawing of meat may result in loss of 3% to 7% of weight.

The overall appearance and quality is diminished when excessive moisture is lost during cooking. The ability to maintain total moisture enhances the ability of the meat products to retain flavor, and also enhances juiciness and tenderness of the cooked product.

Apart from the effect on quality attributes, loss of liquid is also problematic in that the shrinkage and weight loss caused represents loss in revenue to the producers of precooked meat products.

The meat industry has relied heavily on the use of certain additives to reduce the loss of liquid during processing. It has become common practice to treat meat with brine solutions in order to partially inhibit as well as to compensate for excessive moisture loss incurred during cooking. One common approach is to combine fresh meat with an aqueous brine solution comprising salts and phosphates. Such conventional brines may increase the water content of meat in several ways.

Salts may cause the swelling of myofibrils in the meat, which may result in better water retention in the meat. The brining process typically increases the weight of fresh meat about five to fifteen percent. Although some of this water evaporates during cooking, the meat has a higher water content when cooking commences, and thus, the cooked meat may have a higher water content after cooking as compared to non-enhanced meat.

Phosphates may be used in brines to increase the pH of the meat and thereby increase the number of positively charged sites for binding water in the meat.

A factor in the use of brines that is becoming increasingly important, is the desire to work with more natural ingredients, so as to enable the meat processors to present a food ingredient label which is more "friendly". The ideal label statement must not only be truthful, but also would be perceived as natural. Another trend in the industry is the use of ingredients which consumers are already familiar with, such as those commonly seen in household kitchens. Label statements with minimal declared components would be considered as "clean label" and "consumer friendly".

Many other types of "brines" have been proposed over the years, which should address some of the draw-backs associated with conventional brine solutions based on salt and phosphate.

For example, US 2004/0219283 describes the use of trehalose to treat uncooked meat in order to decrease shrinkage during cooking.

The use of sodium bicarbonate in the meat treatment industry has also been previously reported. For example, U.S. Pat. No. 6,020,012 describes the use of sodium bicarbonate as an injectable treatment to reduce the rate of pH decline.

Despite the advances in the food processing arts represented by these and other prior art references, a need continues to exist for improved methods for increasing the moisture content of meats in order to enhance the taste and other desirable qualities of the meat product while at the same time supporting a more "clean and consumer friendly" label statement.

It is the objective of the present invention to provide compositions, which can be used in meat treatment in order to achieve one or more of these objectives.

SUMMARY OF THE INVENTION

The present inventor surprisingly found that this can be accomplished with meat treatment compositions comprising certain combinations of one or more acetic acid salts and one or more polysaccharide materials.

More in particular, as will be illustrated in the appending examples, it has been established that pre-treatment of fresh meat with compositions comprising buffered vinegar and citrus fiber reduced the amount of cooked out juices with as much as 15%.

The present compositions are based on ingredients that, depending on the forms in which they are provided, can be labeled as 'natural ingredients'. More in particular, in some embodiments of the invention, the composition comprises a combination of natural vinegar and plant derived fiber compositions, which not only results in a significant reduction of moisture loss but is also highly advantageous in view of food regulations and labeling requirements.

Hence, the invention provides compositions comprising such combinations of one or more acetic acid salts with one or more polysaccharide materials; methods and uses involving the treatment of meat with said compositions; as well as the meat products that are accordingly obtained.

DETAILED DESCRIPTION OF THE INVENTION

Hence, a first aspect of the invention concerns a meat treatment composition comprising
i) one or more acetic acid salts; and
ii) one or more polysaccharide materials.

As, will be understood by those skilled in the art, based on the foregoing, the compositions of the present invention are particularly suited for use a food additive, more in particular for use as in meat treatment. Hence, in accordance with the invention, the meat treatment composition as well as the components used to produce them are typically 'food grade', meaning that they are acceptable for use in foods and, more in particular, that they would be considered not to be harmful or toxic to a mammal upon consumption of the food products containing them, i.e. when applied at the levels taught herein.

The composition of the present invention comprises one or more salts of acetic acid (or ethanoic acid). Particularly suitable acetic acid salts, include food-grade water soluble salts of acetic acid, such as sodium acetate, calcium acetate and potassium acetate.

In an embodiment of the invention, a meat treatment composition as defined herein is provided, wherein the one or more acetic acid salts are provided in the form of a vinegar or processed vinegar, e.g. a buffered vinegar and/or a vinegar that has been subjected to concentration and/or drying.

Such (processed) vinegars confer favorable organoleptic profiles to food products to which they are added. In a preferred embodiment the vinegar is selected from the group consisting of white vinegar, brandy vinegar, alcoholic vinegar, balsamic vinegar, wine vinegar, malt vinegar, beer vinegar, potato vinegar, rice vinegar, apple vinegar, cherry vinegar, and cane vinegar. In a particularly preferred embodiment of the invention, the vinegar is cane vinegar.

In this document, the term 'buffered vinegar' is used to refer to compositions obtainable by combining a vinegar with a (food grade) alkalizing agent. Such compositions will comprise a mixture of free acetic acid and one or more acetic acid salts or such compositions will comprise one or more acetic acid salts without free acetic acid, depending on the relative amounts of the vinegar and the alkalizing agent, as will be understood by those skilled in the art. In accordance with an embodiment of the invention, the meat treatment composition comprises a buffered vinegar, which typically is obtainable by combining a natural vinegar with an alkalizing agent, preferably an alkalizing metal salt, such as a metal carbonate, or a metal hydroxide. In a preferred embodiment of the invention, the buffered vinegar is obtainable by combining a natural vinegar with sodium hydroxide, potassium hydroxide, calcium hydroxide or a combination thereof.

In accordance with the invention, the meat treatment composition comprises a buffered vinegar, said buffered vinegar comprising metal cations, preferably sodium, potassium and/or calcium cations, at a level of more than 90%, more than 95%, more than 97.5%, more than 98.5%, more than 99%, more than 99.5% more than 99.7%, more than 99.8% or more than 99.9% of the stoichiometric amount (relative to the acetic acid carboxylate groups). As will be understood by those skilled in the art, 'stoichiometric amount' in this context refers to the theoretical amount of metal cations necessary to provide a counterion for every acetic acid carboxylate group. Said stoichiometric amount thus depends on the amount of acetate anions present in the vinegar as well as on the valence of the metal cation(s) contained in the alkalizing agent, and those of average skill in the art are capable of calculating the appropriate amounts of vinegar and the alkalizing agent, to achieve the desired percentage as defined above.

In accordance with an embodiment of the invention, the vinegar is provided in the form of a free flowing powder. The production of free flowing powders from buffered vinegars, using conventional drying techniques such as spray-draying, has been described in the art. For example, international patent application no. WO/2014/021719 describes processes of producing free flowing powders from buffered vinegar, i.e. as an intermediate product. Additionally, buffered vinegars in free-flowing powder form are commercially available.

The meat treatment compositions of the invention comprise one or more polysaccharide materials, as stated herein before. Particularly suitable examples of polysaccharide materials in accordance with the invention include starches, vegetable gums, pectin and plant derived fiber materials.

Without wishing to be bound by any theory, it is believed that the advantageous effects of combinations of acetate salt(s) and polysaccharide material(s) are in part based on the water-binding capacity of the polysaccharide material(s). In a preferred embodiment of the invention, the one or more polysaccharide materials exhibit a water holding capacity of at least 3 g of water per gram of polysaccharide material, preferably the one or more polysaccharide materials exhibit a water holding capacity within the range of 4-25 g of water per gram of polysaccharide material, most preferably within the range of 5-20 g of water per gram of polysaccharide material.

The water holding capacity of polysaccharide materials can be measured using the following procedure: 2.5 g of the polysaccharide material (dry powder) is placed into a 50 mL centrifuge tube and weighed (noted as W1). Then 40 g of milli-Q water (noted as W2) is added. The tube can then be closed and stirred by hand for one minute. The tube can be subjected to centrifugation for ten minutes at 2000 rpm, and the supernatant can then be decanted and weighed (noted as W3). The water holding capacity (WHC) of the polysaccharide material can be calculated by the following formula: $WHC=(W2-W3)/W1$. The WHC is expressed as grams of water per gram of polysaccharide material (g water/g polysaccharide material).

In accordance with the invention, the one or more polysaccharide materials may be or comprise a natural gum. The term "gum" denotes a group of industrially useful polysaccharides (long chain polymer) or their derivatives that hydrate in hot or cold water to from viscous solutions, dispersions or gels. Gums are classified as natural and modified. Natural gums include seaweed extracts, plant extrudates, gums from seed or root, and gums obtained by microbial fermentation. (Gums in Encyclopedia Chemical Technology 4.sup.th Ed. Vol. 12, pp 842-862, J. Baird, Kelco division of Merck). Commonly available natural gums, which are well known as thickening agents in the field of food processing in general and can suitably be used in accordance with the present invention include agar, alginic acid, alginate, carrageenan, gum arabic, gum ghatti, gum tragacanth, karaya gum, guar gum, locust bean gum, beta glucan, chicle gum, dammar gum, glucomannan gum, mastic gum, psyllium seed husk, spruce gum, tara gum, gellan gum, and xanthan gum. In a particularly preferred embodiment of the invention, the one or more polysaccharide materials are selected from the group consisting of carrageenan, psyllium, seed husk and mixtures thereof.

In accordance with the invention, the one or more polysaccharide materials may be or comprise starch. In the context of the present invention, the term 'starch' is used in its common meaning as referring to plant derived materials mainly comprising the polysaccharides amylose and amylopectin with the formula $(C_6H_{10}O_5)_x$, wherein x can be any number. Starch is found in nearly every type of plant tissue including, but not limited to the fruit, seeds, stems, leaves, rhizomes and/or tubers. Commercially available starches are mostly derived from corn, potatoes, rice, and wheat. However, useful starches can come from any source e.g., arrowroot, tapioca (cassava), buckwheat, banana, barley, cassava, konjac, kudzu, oca, sago, sorghum, sweet potato, taro, yams and beans e.g., favas, lentils and peas. Starches may vary in their weight percentages of amylose and amylopectin, in the polymer molecular weights, etc. High amylose starches contain greater than about 50% by weight amylose and low amylose starches contain less than about 50% by weight amylose. Additionally, starches may be modified, meaning that the starch has been treated chemically, physically or enzymatically to change its properties, as is generally know by those skilled in the art. In a particularly preferred embodiment of the invention, the one or more polysaccharide materials are selected from the group consisting of potato starch, corn starch, wheat starch, rice starch and mixtures thereof.

In accordance with the invention, the one or more polysaccharide materials may be or comprise pectin. As used herein, the term "pectin" means a neutral polysaccharide that consists mainly of partly methoxylated polygalacturonic acid. The term pectin also encompasses modified pectins, e.g. chemically modified pectins or enzymatically modified pectins. Pectins are commonly used as food ingredients, e.g. as food-thickening agent.

In accordance with the invention, the one or more polysaccharide material may be or comprise a plant derived fiber material, especially a fiber material obtained from parenchymal cell containing plant tissue. More in particular, the one or more polysaccharide materials may comprise so-called shear-disrupted parenchymal cell wall (PCW) materials. These materials contain cellulose fiber as the main constituent together with hemicelluloses and pectin in varying (relative) amounts. They are typically obtained from plant parts containing PCW rich tissue, in particular non-woody plant parts, such as fruits and roots. Suitable materials for producing the shear-disrupted PCW materials are produce as side-streams in conventional food processing such as the production of juices from fruits and the production of sugar from beet root. The production of plant polymer materials suitable for use in the invention generally speaking, comprises pulping plant parts containing PCW rich tissue and subjecting the pulp thus obtained to mechanical shear while in a hydrated state, resulting in the opening up of the internal fiber structure, thereby increasing the water holding capacity of the PCW material. Such methods and the materials obtainable thereby are well-known in the art. PCW materials suitable for producing the plant materials of this invention are found, for example, in fruits, vegetables and grains, such as tomatoes, peaches, pears, apples, plums, lemons, limes, oranges, grapefruits, peas, oats, barley, soy, beets, carrots, potato, bamboo, wheat etc. The invention is not limited in this regard. Particularly good results though have been obtained with plant polymer material derived from citrus fruits, especially from citrus flesh, citrus peel and combinations thereof, most preferably from citrus flesh, such as lemon flesh, orange flesh, lime flesh and grapefruit flesh.

The plant derived fiber material is obtainable from such sources by processes generally known by those skilled in the art. In a particularly preferred embodiment of the invention, the plant polymer material is obtainable by a process comprising the steps of:

a) providing a plant pulp rich in parenchymal cell wall material;

b) soaking the plant pulp in an aqueous liquid;

c) optionally draining and washing the soaked plant pulp one or several times; and d) subjecting the soaked plant pulp in a hydrated state to high pressure homogenization. The materials accordingly obtained can be subjected to conventional drying processes resulting in free flowing powder that can be re-dispersed in water.

WO 2006/033697, the disclosure of which is hereby incorporated by reference in its entirety, describes exemplary processes for producing the plant fiber materials suitable for use in the present invention.

It is known to those skilled in the art that treatment of the plant pulp with chemicals (e.g. acids and/or bases), enzymes (e.g. pectinase, protease, cellulase, hemicellulase or mixtures thereof) and/or heat, affects the solubilization and extraction of certain PCW components, in particular pectin and hemicelluloses. This may be used to tailor the specific properties of the fiber material, especially the water binding capacity and/or viscosifying properties.

Particularly suitable plant derived fiber materials are commercially available from suppliers like J. Rettenmaier and Sohne GMBH under the Vitacel brand/name; Herbafood Ingredients under the Herbacel brand/name; and Fiberstar under the Citri-fi brand/name.

In an embodiment of the invention, a meat treatment composition as defined herein is provided, wherein the one or more acetic acid salts and the one or more polysaccharide materials are present in a weight ratio within the range of 10/1-0.5/1, preferably in a weight ratio within the range of 5/1-1/1, more preferably in a weight ratio within the range of 3/1-1.5/1.

In an embodiment of the invention, a meat treatment composition as defined herein is provided comprising the one or more acetic acid salts in an amount of up to 99 wt. %, up to 95 wt. % or up to 90 wt. %. In an embodiment of the invention, a meat treatment composition as defined herein is provided comprising the one or more acetic acid salts in an amount of at least 50 wt. %, at least 60 wt. %, at least 70 wt. %, at least 80 wt. % or at least 90 wt. %.

In an embodiment of the invention, a meat treatment composition as defined herein is provided comprising the one or more acetic acid salts in an amount of 50-90 wt. %, based on the total dry weight of the composition, preferably in amount of 55-80 wt. %, more preferably in amount of 60-70 wt. %.

In an embodiment of the invention, a meat treatment composition as defined herein is provided comprising the one or more polysaccharide materials in an amount of 1-70 wt. %, based on the total dry weight of the composition, preferably in amount of 5-60 wt. %, more preferably in amount of 10-50 wt. %.

In an embodiment of the invention, meat treatment compositions as defined herein are provided, comprising additional ingredients commonly applied in food processing, especially in brining of meat. Such additional ingredients are typically selected from the group of sodium chloride, phosphate salts, potassium chloride, lemon juice, citric acid salts, sugar, spices, herbs, ascorbic acid or salts thereof, flavours and mixtures thereof. These further ingredients may be applied at an amount of 0-50 wt. %, based on the total dry weight of the composition, preferably in amount of 2.5-40 wt. %, more preferably in amount of 5-30 wt. %.

In an embodiment of the invention, meat treatment composition as defined herein does not contain substantial amounts of phosphate. More preferably, the meat treatment composition of the invention, comprises less than 5 wt. %, based on the total dry weight of the composition, of phosphate, preferably less than 1 wt. %, less than 0.5 wt. %.

The meat treatment compositions of the invention are typically produced by blending the polysaccharide material(s) with the acetic acid salt(s). Both the acetic acid salt and the polysaccharide material are commercially available products, as already noted herein. Suitable products containing the acetic acid salt are commercially available in liquid as well as solid form. The commercially available polysaccharide materials will typically be in solid form.

In one embodiment of the invention, the meat treatment composition is obtainable by blending a source of polysaccharide material, which will typically be provided in the form of a free flowing powder, with a (buffered) liquid vinegar, as described herein before. Next, the ingredients are typically agitated for a period of time sufficient to disperse the polysaccharide material uniformly throughout the liquid so as to form a slurry. After the agitation is completed, the slurry is typically allowed to stand in order for the polysaccharide material to become fully hydrated. Depending on the concentration of acetic acid salt in the liquid, a slurry may be produced that is ready for use in the treatment of meat, following the procedures described below. Alternatively, a concentrated slurry can be produced that intended for use after dilution with water. It is also contemplated that the slurry is processed into a solid or semi-solid composition by (conventional) drying techniques aimed at the removal of part of the water. This is particularly convenient when the meat treatment is not performed at the site where the meat treatment composition is produced, so as to reduce the volume of water in the product to be stored and transported, which has obvious advantages.

In an alternative embodiment of the invention, the meat treatment compositions of the invention can suitably be produced by dry blending an acetic acid salt and a polysaccharide material that are both in free-flowing powder form. As noted before, solid products offer particular advantages in case meat treatment is performed elsewhere. Before use, the dry blends are dispersed in water, typically with agitation for a period of time sufficient to disperse the polysaccharide material uniformly throughout the liquid so as to form a slurry. After the agitation is completed, the slurry is typically allowed to stand in order for the fiber material to become fully hydrated.

As will be understood, on the basis of the foregoing, the compositions of the present invention can have widely varying amounts of dry solids. More in particular, compositions are envisaged substantially consisting of the one or more acetic acid salts and the one or more polysaccharide materials, which compositions are typically intended for use after dispersing in water, as well as ready-to-use compositions comprising the acetic acid salt(s) and polysaccharide material(s) at concentrations suitable for treatment of meat.

Hence, in an embodiment of the invention, a meat treatment composition as defined herein is provided, wherein the composition is formulated as a dry powder comprising the one or more acetic acid salt(s) and the one or more polysaccharide material(s) in a combined amount of at least 75 wt. %, based on the total weight of the dry powder, more preferably in a combined amount of at least 80 wt. %, most preferably in a combined amount of at least 90 wt. %. In an embodiment of the invention, the dry powder consists substantially or entirely of the one or more acetic acid salts and the one or more polysaccharide materials. In an embodiment of the invention, the dry powder consists substantially or entirely of a vinegar powder and a polysaccharide material.

In an embodiment of the invention, a meat treatment composition as defined herein is provided, wherein the composition is formulated as a concentrated slurry. The concentrated slurry typically comprises the one or more acetic acid salts and the one or more polysaccharides in combination with water. Such concentrated slurries are typically intended for dilution with water before use. Such concentrated slurries will typically comprise the one or more acetic acid salts and the one or more polysaccharide materials in a combined amount of at least 20 wt. %, based on the total weight of the concentrated slurry, more preferably in a combined amount of at least 40 wt. %, most preferably in a combined amount of at least 50 wt. %.

In an embodiment of the invention, a ready-to-use liquid slurry (or 'brine') is provided comprising the meat treatment composition as defined herein. This liquid slurry typically comprises the one or more acetic acid salts and the one or more polysaccharides in combination with water. Such liquid slurries will typically comprise the one or more acetic acid salts and the one or more polysaccharide materials in a combined amount of 0.1-20 wt. %, based on the total weight of the liquid slurry, more preferably in a combined amount of 0.25-10 wt. %, most preferably in a combined amount of 0.5-8 wt. %. In an embodiment of the invention, this ready-to-use liquid slurry comprises the one or more acetic acid salts in an amount within the range of 0.5-15 wt. %, based on the total dry weight of the liquid slurry, more preferably in an amount of 1-10 wt. %, most preferably in an amount of 2-5 wt. %, based on the total dry weight of the liquid slurry. In an embodiment of the invention, the ready-to-use liquid slurry comprises the one or more polysaccharide materials in an amount within the range of 0.25-10 wt. %, based on the total weight of the liquid slurry, more preferably in an amount of 0.5-7 wt. %, most preferably in an amount of 1-5 wt. %, based on the total weight of the liquid slurry. In an embodiment of the invention, the ready-to-use liquid slurry has a pH within the range of 4-9, more preferably within the range of 5-8, most preferably within the range of 5.5-7

A second aspect of the invention concerns a method of treating meat to reduce and/or compensate for moisture loss during cooking and/or during other kinds of processing, such as cooling, freezing and/or thawing.

In an embodiment of the invention, a method as defined herein is provided, wherein the meat is treated with a meat treatment composition of the invention, typically in the form of a liquid slurry referred to here above as the 'ready-to-use' liquid slurry (or 'brine').

The method of the invention typically comprises the steps of:
a) providing a quantity of meat;
b) providing a meat treatment composition as defined herein, typically in the form of a liquid slurry as defined herein; and
c) treating said meat with the meat treatment composition by mixing, injection or surface treatment.

The method according to the present invention is suitable and beneficial for the treatment of most conventional meat products typically offered for human consumption, regardless of the source and/or form in which it is offered.

In an embodiment of the invention, the meat is selected from the group consisting of whole muscle meat, cuts or slices of whole muscle meat, ground or comminuted muscle meat and emulsified meat. In a preferred embodiment of the invention the meat is fresh meat, which may be in the form of whole muscle meat, cuts or slices of whole muscle meat or ground or comminuted muscle meat. In this context the term 'fresh' means that the meat has not been treated by cooking in between removal from the animal carcass and the treatment according to the invention. In a preferred embodiment, the meat is uncooked meat. Embodiments are envisaged wherein the meat has been stored, typically under refrigeration for some time in between removal from the animal carcass and the treatment according to the invention.

In an embodiment of the invention, the meat is obtained from beef cattle, pork, lamb, poultry, and game, most preferably from pork, chicken and turkey.

The actual amount of slurry to used for treating meat and/or the weight gain of the meat will vary depending on the method of treating the method, the type of meat, and the particular meat treatment composition used.

In accordance with certain embodiments of the invention, the meat is treated with a sufficient amount of the liquid slurry and in a manner sufficient to cause a weight increase in the range of 2-20%, more preferably in the range of 5-15%.

In accordance with certain embodiments of the invention, the meat is treated with a composition in the form of a liquid slurry as defined herein before, in quantities providing a weight ratio of aqueous slurry to meat within the range of 1/10-1/2, preferably within the range of 1/8-1/3, more preferably within the range of 1/7-1/4.

In accordance with certain embodiments of the invention, the meat is treated with a liquid slurry as defined herein before, in quantities providing a level of the one or more acetic acid salts of 0.1-2.5 g per 100 g of meat, more preferably 0.2-2.5 g per 100 g of meat, most preferably 0.5-2. g per 100 g of meat. In accordance with certain embodiments of the invention, the meat is treated with a liquid slurry as defined herein before, in quantities providing a level of the polysaccharide material of 0.1-2.5 g per 100 g of meat, more preferably 0.2-2 g per 100 g of meat, most preferably 0.3-1 g per 100 g of meat.

The methods for treating the meat may utilize any method that is known and/or conventionally used for combining fresh meat and a brine product. For example, meat may be treated with the composition of the invention by dispersing it throughout the fresh meat. Suitable methods include injecting, pumping, spraying, soaking, dipping or otherwise dispersing the composition into or onto the meat. In addition, the method may comprise tumbling, kneading, massaging or otherwise manipulate the meat to further disperse the composition throughout the meat. In some embodiments, the composition is injected under pressure into the meat as part of an automated commercial meat production step. Suitable injectors may be set to pump a particular volume of the composition into each piece of meat.

In the case of comminuted or emulsified meat, the slurry may simply be added to the meat followed by tumbling, kneading or massaging of the meat so as to cause the slurry to be evenly distributed throughout the meat. The treated meat may then be molded or otherwise shaped to form any number of food products including patties, sausages, wieners and luncheon meats.

Once the slurry has been dispersed throughout the meat, the meat may subsequently be cooked until the desired internal temperature is reached, packaged and refrigerated or frozen. Alternatively, once the slurry has been dispersed throughout the meat, the meat may be packaged, cooked then refrigerated or frozen. Hence, in an embodiment of the invention, a method as defined herein is provided, further comprising one or more of the following steps (in any order/sequence):

d) forming the meat into shaped food products;

e) cooking the meat;

f) refrigerating or freezing the meat; and g) packaging the meat.

It will be understood by those skilled in the art, that the benefits of the invention may also be achieved by treating meat sequentially with the one or more acetic acid salts and the one or more polysaccharide materials, although such an embodiment would be less preferred for practical reasons. It is entirely within the skills and capabilities of those skilled in the art to develop such a variant of the process though.

A further aspect of the invention concerns a meat product obtainable by the method as defined herein. Such treated meat may possess higher total water content when cooking commences, which may result in a higher water content remaining after cooking meat even if normal water loss occurs during cooking. Instead or in addition, the treated meat may have a reduced tendency to lose water during cooking. The coloration of treated meat may also be retained for a longer period of time, such that the meat has a more desirable appearance for a longer time.

A further aspect of the invention concerns the use of a combination of:

i) one or more acetic acid salts; and ii) a one or more polysaccharide material(s);

as defined herein before, for reducing moisture loss during processing, cooking, refrigerating, freezing, thawing and/or storage of meat.

The invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

Furthermore, for a proper understanding of this document and in its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

All patent and literature references cited in the present specification are hereby incorporated by reference in their entirety.

The following examples are offered for illustrative purposes only, and are not intended to limit the scope of the present invention in any way.

EXAMPLES

Example 1: Effect of Various Fiber Compositions in Turkey Breast

The increase of cook yield by various fiber compositions in a turkey meat formulation was investigated. Laboratory scale tests were performed using 13 mm pieces of turkey breast to which 33% w/w of a brine solution was added containing, in water, 6.9% sea salt, 2.8% cane sugar, and 4.0 or 8.0% of one of the following fiber compositions: citrus flour (Citri-Fi® 100, Fiberstar Inc), oat fiber (SunOpta™), carrot fiber (BI Nutraceuticals).

The meat pieces and brine were mixed slowly by hand for 1 minute and tumbled in bags to distribute the brine and improve cohesiveness' in the final cooked product. After tumbling the meat slurry was vacuumized in a cook-in shrink bag and shaped in an aluminum can. The cans were heated in a steam oven until the meat has reached an internal temperature of 72° C. and then cooled down.

The cook loss was assessed as the weight difference between the turkey meat product before and after cooking (without unbound liquid), related to the weight of the meat product before cooking. The cook yield is defined as 100% minus the % cook loss. The yield improvement was assessed as the difference in yield between the test product and a control product wherein the brine didn't comprise any fiber (or other yield improving ingredient).

The use of 4% citrus flour in the brine improved the yield in turkey breast with 3.2% compared to the control.

The use of 8% oat fiber flour in the brine improved the yield in turkey breast with 4.5% compared to the control.

The use of 8% carrot fiber in the brine improved the yield in turkey breast with 6% compared to the control.

Example 2: Effect of Various Polysaccharide Compositions in Ground Turkey Meat The experiment set-up was the same as in example 1. The following polysaccharides were used: potato extract (IQA 5038, Basic American Foods, apple fiber (COG, BI Nutraceuticals), citrus flour (CitriFi® 100 M40, Fiberstar Inc), potato starch (N-HANCE 59, Ingredion).

The following improvements of yield were obtained compared to a control without polysaccharide:

| Polysaccharide (% in brine) | Improvement (compared to control) |
| --- | --- |
| 8% potato extract | 5.6% |
| 8% apple fiber | 1.4% |
| 2% citrus flour | 4.6% |
| 8% potato starch | 9.2% |

Example 3: Effect of Fiber and Vinegar in Turkey Breast

The increase of cook yield by citrus flour combined with buffered vinegar in a turkey meat formulation was investigated. Laboratory scale tests were performed using grinded pieces (13 mm) of turkey breast to which 33% w/w of a brine solution was Added containing, in water, 6.9% sea salt, 2.8% cane sugar, 1.8%6 of citrus flour (Citri-Fi® 100, Fiberstar Inc) and 3.6% of vinegar that has been combined with a stoichiometric amount of NaOH and dried to >98%6 dry matter.

The meat pieces and brine were mixed slowly by hand for 1 minute and tumbled in bags to distribute the brine and improve cohesiveness' in the final cooked product. After tumbling the meat slurry was vacuumized in a cook-in shrink bag and shaped in an aluminum can. The cans were heated in a steam oven until the meat has reached an internal temperature of 72° C. and then cooled down.

A combination of buffered vinegar and citrus flour with a total use level of 1.35% improved the yield in turkey breast with 3.9% compared to a control without those ingredients.

Example 4: Effect of Carrageenan and Vinegar in Pork

Enhancement of water binding in pork with a 25% brine pump containing NaCl (8.5%), cane sugar (3.5%) and 2.5% carrageenan (ME2251, FMC) or 2.5% carrageenan in combination with 3.5% buffered vinegar (see example 3] in water. The brine was added to ground pork meat (size of the pieces 13 mm), mixed, tumbled and packed in vacuum bags. The hams were cooked in cooking cans to an internal temperature of 72° C.

If only carrageenan was used the yield was improved with 5.8% compared to the control (no yield enhancer). Use of the combination of vinegar and carrageenan improved the yield with 10.2%.

Example 5: Effect of Citrus Flour and Vinegar in Pork

Enhancement of water binding in pork with a 25% brine pump containing NaCl (8.5%), cane sugar (3.5%) and 2.5% citrus flour (Herbacel AQ plus N01, Herbafood Ingredients GmbH) in combination with 3.5% buffered vinegar [see example 3] in water. The brine was added to ground pork meat (size of the pieces 13 mm), mixed, tumbled and packed in vacuum bags. The hams were cooked in cooking cans to an internal temperature of 72° C.

Vinegar with citrus flour (2.5% Herbacel) improved the yield with 10.1% compared to the control (no yield enhancer).

Example 6: Effect of Citrus Flour and Vinegar in Turkey

The increase of cook yield by citrus flour combined with buffered vinegar in a turkey meat formulation was investigated. Laboratory scale tests were performed using pieces of grinded turkey breast (size 13 mm) to which 33% w/w of a brine solution was added containing, in water, 6.9% sea salt, 2.8% cane sugar, 2.0% of citrus flour (Citri-Fi® 100, Fiberstar Inc) or 2.0% of citrus flour (Herbacel AQ plus N01, Herbafood Ingredients GmbH) and 2.8% of vinegar that has been combined with a stoichiometric amount of NaOH and dried up to at least 98% dry matter.

The meat pieces and brine were mixed slowly by hand for 1 minute and tumbled in bags to distribute the brine and improve cohesiveness' in the final cooked product. After tumbling the meat slurry was vacuumized in a cook-in shrink bag and shaped in an aluminum can. The cans were heated in a steam oven until the meat has reached an internal temperature of 72° C. and then cooled down.

The second experiment gave the following results:
Vinegar with citrus flour (Herbacel) improved the yield with 5.2% compared to the control.
Vinegar with citrus flour (Citri-Fi) improved the yield with 3.7% compared to the control.

A second experiment with turkey meat from another origin resulted in the following results:
Vinegar with citrus flour (Herbacel) improved the yield with 6.0% compared to the control.
Vinegar with citrus flour (Citri-Fi) improved the yield with 2.4% compared to the control.

A third experiment with turkey meat from another origin and carried out at another lab with slightly different equipment resulted in the following results:
Vinegar with citrus flour (Herbacel) improved the yield with 4.6% compared to the control.
Vinegar with citrus flour (Citri-Fi) improved the yield with 3.3% compared to the control.

Example 7: Effect of Potato Starch and Vinegar in Turkey

The increase of cook yield by potato starch combined with buffered vinegar in a turkey meat formulation was investigated. Laboratory scale tests were performed using grinded turkey breast (size pieces 13 mm) to which 33% w/w of a brine solution was added containing, in water, 6.9% sea salt, 2.8% cane sugar, 8% potato starch (N-HANCE 59, Ingredion), 10% lemon juice (clarified, pH 9.5) and 2.8% of vinegar that has been combined with a stoichiometric amount of NaOH. and dried up to >98% dry matter.

The meat pieces and brine were mixed slowly by hand for 1 minute and tumbled in bags to distribute the brine and improve cohesiveness' in the final cooked product. After tumbling the meat slurry was vacuumized in a cook-in shrink bag and shaped in an aluminum can. The cans were heated in a steam oven until the meat has reached an internal temperature of 72° C. and then cooled down.

With the combination of potato starch, lemon juice and vinegar, the yield was improved with 10.5% compared to a control without these ingredients.

The invention claimed is:

1. A method of treating meat to reduce moisture loss incurred during cooking, refrigerating, freezing, thawing and/or storing of raw meat, the method comprising injecting into or treating onto the surface of the raw meat an aqueous slurry composition having a pH in the range of 4-5 and comprising:
(a) 2-5 wt. % of one or more acetic acid salts;
(b) 1-5 wt. % of a citrus flour having a water holding capacity of at least 3 g water/gram and comprising shear-disrupted parenchymal citrus fruit cell wall material; and
(c) water,
wherein the ratio of acetic acid salt to citrus flour is within the range of 3/1-1.5/1 and wherein the acetic acid salt(s) and citrus flour make up at least 80% of the dry solids present in the slurry.

2. The method according to claim 1, wherein the weight ratio of aqueous slurry to raw meat is within the range of 1/10 and 1/2.

3. The method according to claim 1, further comprising one or more of the following:
(a) cooking the meat;
(b) refrigerating or freezing the meat; and
(c) packaging the meat.

4. The method according to claim 1, wherein the raw meat is whole muscle meat.

5. A meat product obtainable by the method of claim 1.

6. The method according to claim 1, wherein the one or more acetic acid salts are provided in the form of a buffered vinegar.

7. The method according to claim 1, wherein the acetic acid salt(s) and citrus flour make up at least 90% of the dry solids present in the slurry.

* * * * *